(12) United States Patent
North et al.

(10) Patent No.: US 7,430,259 B2
(45) Date of Patent: Sep. 30, 2008

(54) TWO-WIRE CHIP-TO-CHIP INTERFACE

(75) Inventors: Brian North, Los Gatos, CA (US); Douglas S. Smith, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 673 days.

(21) Appl. No.: 10/850,707

(22) Filed: May 21, 2004

(65) Prior Publication Data

US 2005/0232367 A1 Oct. 20, 2005

Related U.S. Application Data

(60) Provisional application No. 60/563,315, filed on Apr. 19, 2004.

(51) Int. Cl.
*H04L 7/00* (2006.01)

(52) U.S. Cl. .................. 375/354; 375/355; 375/257; 327/141

(58) Field of Classification Search .................. 375/257, 375/219, 354, 365, 368; 327/141
See application file for complete search history.

(56) References Cited

U.S. PATENT DOCUMENTS

| 6,985,546 B2 * | 1/2006 | Kumata ...................... 375/354 |
| 2005/0128962 A1 * | 6/2005 | Dybsetter et al. ........... 370/278 |

* cited by examiner

*Primary Examiner*—David C. Payne
*Assistant Examiner*—Leon Flores
(74) *Attorney, Agent, or Firm*—Howison & Arnott, L.L.P.

(57) ABSTRACT

A method for communicating data over a serial interface between a master device and at least one slave device is disclosed. A master device generates a preamble that is attached to a data block for transmission over the serial interface between a master device and at least one slave device. Upon receipt of the control word at the at least one slave device, the preamble is detected by the slave device. Upon detection of the preamble, the slave device is enabled to respond to information within the control word as appropriate.

19 Claims, 7 Drawing Sheets

TWO-WIRE CHIP-TO-CHIP INTERFACE

CROSS-REFERENCE TO RELATED APPLICATIONS

This application claims priority from U.S. Provisional Application No. 60/563,315, filed on Apr. 19, 2004.

TECHNICAL FIELD OF THE INVENTION

The present invention relates to interfaces for providing digital serial data communication between chips, and more particularly, to a system and method for providing a two-wire chip-to-chip digital serial interface.

BACKGROUND OF THE INVENTION

Serial communication interfaces between devices normally consist of a serial data line and a serial clock line. Both the serial data line and serial clock line are connected to a positive supply via a pull-up resistor and remain high when the bus is not in use. Each device using the serial communications interface is recognized by a unique address associated with the device. Each device connected to a serial bus must have an open drain or an open collector output for both the serial data line and the serial clock line. The data on the serial data line can be transferred at up to 100 kilobytes per second. The number of devices connected to the serial data line and the serial clock line are limited only by the maximum bus capacity of the lines.

Existing systems providing serial communications pass messages between devices rather than tripping individual control lines. Some digital serial data connections include a latch enabled control signal typically applied to a pin referred to as the LEN or SLEN pin. This requires most serial data interfaces to include three lines, namely, the data line, the clock line and the latch enable control signal line. If some method were available for eliminating the latch enable control signal, the number of PINs required on component packages could be greatly reduced resulting in cost savings to manufacturers.

SUMMARY OF THE INVENTION

The present invention disclosed and claimed herein, in one aspect thereof, comprises a method for communicating data over a serial interface between a master device and at least one slave device. A preamble is generated at the master device and attached to a data block for transmission over the interface from the master device to the at least one slave device. The control word is received by the at least one slave device, and the slave device detects the preamble included within the control word. Upon detection of the preamble, the slave device may then be enabled to respond to the received control word.

BRIEF DESCRIPTION OF THE DRAWINGS

For a more complete understanding of the present invention and the advantages thereof, reference is now made to the following description taken in conjunction with the accompanying Drawings in which:

FIG. 2b is a block diagram of a control word for use with a two-wire chip-to-chip interface more fully describing the data portion of FIG. 2a;

DETAILED DESCRIPTION OF THE INVENTION

Figure 1:
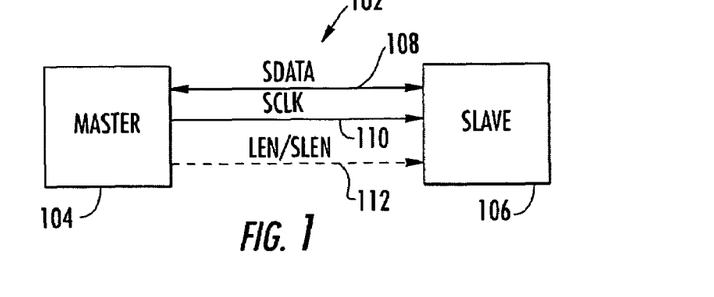
FIG. 1 is a block diagram of a digital serial data communication link between two chips.

Referring now to the drawings, and more particularly to FIG. 1, there is illustrated a block diagram of a digital serial interface 102 between a master chip 104 and a slave chip 106. The master chip 104 and slave chip 106 may comprise any type of digital devices that may interact with each other. The master chip 104 will control the communications over the digital serial data interface 102, and the slave chip 106 will monitor the digital serial data interface 102 for communications which are addressed specifically to the slave chip 106. Communications from the master chip 104 to the slave chip 106 are specifically addressed to the slave chip 106, and the identification of the slave chip 106 for which a transmission is intended included within any messages transmitted from the master chip 104 is recognized by the slave chip 106.

The two-wire interface includes the SDATA line 108 and the SCLK line 110. All communications between the master chip 104 and the slave chip 106 may be carried out using only the SDATA line 108 and SCLK line 110 as more fully described herein below. Traditionally three-wire digital serial data interfaces also include a latch enable line 112 referred to as the LEN or SLEN line. In various embodiments of the provided disclosure, the LEN/SLEN line 112 may be included within the digital serial data interface 102 and not used for communications between the master chip 104 and the slave chip 106. Alternatively, in order to reduce PIN counts on packages, the LEN/SLEN pin may be completely removed from the chip.

The following description relates to a novel two-wire interface for a digital serial interface 102 between a master chip 104 and a slave chip 106. It should be realized that in addition to being implemented within a single master chip 104 and a single slave chip 106, a configuration including a single master chip 104 and multiple slave chips 106 may also be utilized. The master chip 104 initiates all communications, but the slave chip 106 may also read from and write to the master chip 104.

The proposed two-wire interface avoids the need for the latch enable control line 112 required in traditional three-wire serial control interfaces. The latch enable signal on the LEN/

SLEN line 112 is omitted by attaching a short preamble sequence to the leading edge of control words 202 transmitted from the master chip 104 to the slave chip 106 to initiate Read/Write operations as illustrated with respect to FIG. 2*b*.

Figure 2A:
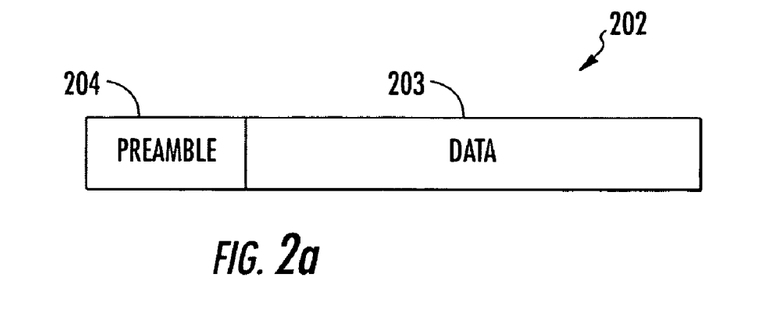
FIG. 2a is a block diagram of a control word including a preamble for the two-wire interface of the present disclosure.
Figure 2B:
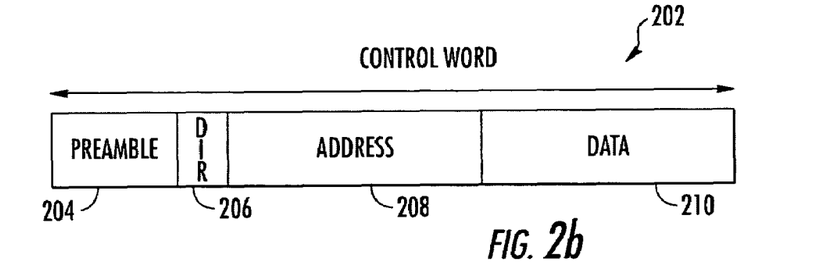

Referring now to FIG. 2*a*, there is illustrated a control word 202 for use on the two-wire serial interface 102 of the present disclosure. In existing three-wire interfaces, the transmission from the master chip 104 to the slave chip 106 would consist only of the data portion 203. This is because the latch enable line 112 was responsible for indicating to the slave chip 106 when it was receiving data over the interface 102. According to the present disclosure, a short preamble 204 is attached to the transmitted data 203 to form the complete control word 202. The short preamble 204 provides an indication to a particular slave chip 106 of data that is to be either written to or read from the slave chip 106.

Referring now more particularly to FIG. 2*b*, there is provided a more complete illustration of the control word 202. The preamble 204 is designed so as not to interfere with a normal three-wire serial bus operation. The preamble 204 provides an indication of when data is to be transmitted over the two-wire interface 102. This process will be more fully described in a moment with respect to FIG. 3. The notification within the preamble 204 is provided by reversing the roles of the SDATA line 108 and the SCLK line 110 in the existing three-wire interface.

The direction bit 206 follows the preamble and is not always required. The direction bit provides an indication if the requested operation is a Write to the data registers of the slave chip 106 or a Read from the data registers of the slave chip 106. In a limited set of application cases some registers in the slave chip 106 will only be written to from the serial interface and/or some registers in the slave chip 106 will only be read from the serial interface. Hence, the read or write operation could be determined by the register address location of the register being addressed. Under these conditions a separate direction bit would not be necessary. In situations where the direction bit 206 is not required, the direction bit 206 will become part of the address field 208. The address field 208 is typically seven bits long. The address field 208 provides the address to which the data is to be written to or read from the slave chip 106. The data field 210 normally comprises an 8-bit byte of data. The data field 210 contains the data being transferred over the serial data interface 102. It should be realized by one skilled in the art that the length of the address field 208 and the data field 210 may be of other sizes if necessary. Alternatively, the data field 210 could be received before the address field 208.

Figure 3:
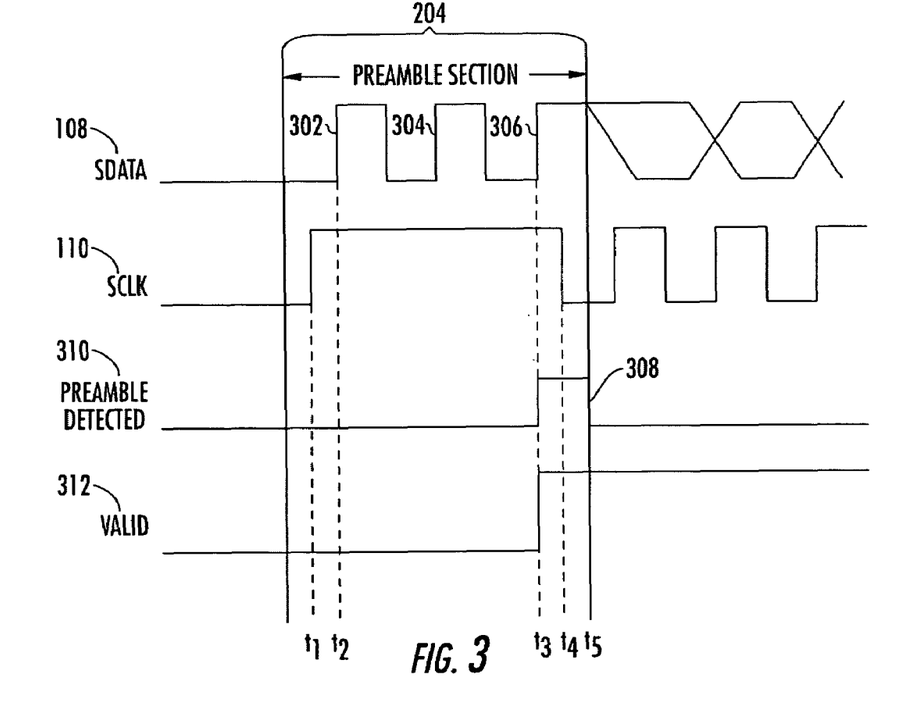
FIG. 3 is a timing diagram illustrating the preamble necessary for operation of the two-wire chip-to-chip interface.

Referring now to FIG. 3, there is more fully illustrated the manner in which the preamble 204 provides an indication of data for a slave device within the control word 202. As mentioned above, the preamble 204 is designed so as not to interfere with a normal three-wire serial bus operation so that chips having three-wire configurations may operate using the new two-wire interface and protocol. This has been achieved by reversing the role of the SCLK line 110 and the SDATA line 108. As can be seen in FIG. 3, when data is to be transmitted on the interface, the SCLK line 110 becomes a data transmission line and at time $t_1$ goes from low to high and maintains its high level until time period $t_4$. While the SCLK line 110 is maintained constant at the high level from time period $t_1$ to time period $t_4$, the SDATA line 108 begins providing a clock signal beginning at point $t_2$ and continuing until time $t_5$ at the end of the preamble section 1204.

In the normal operation of the three-wire interface, the data line 108 never changes from high to low or low to high until the clock signal on the SCLK line 110 is also toggling responsive to the applied clock signal. Only in the described preamble 204 does the data line 108 change state, i.e., going from high to low or low to high while the SCLK line 110 is held static. In the example illustrated in FIG. 3, the SDATA line 108 goes high three times responsive to the provided clock signal (302, 304, 306), while the signal on the SCLK line 110 remains constant. In response to these signals, a pulse 308 is generated indicating that a preamble 204 has been detected. This is generated on the preamble detected line 310. While the present description has made the detection of three pulses the triggering event for generation of the preamble detected pulse 308, any number of pulses may be utilized for a determination of preamble detection.

Figure 6:
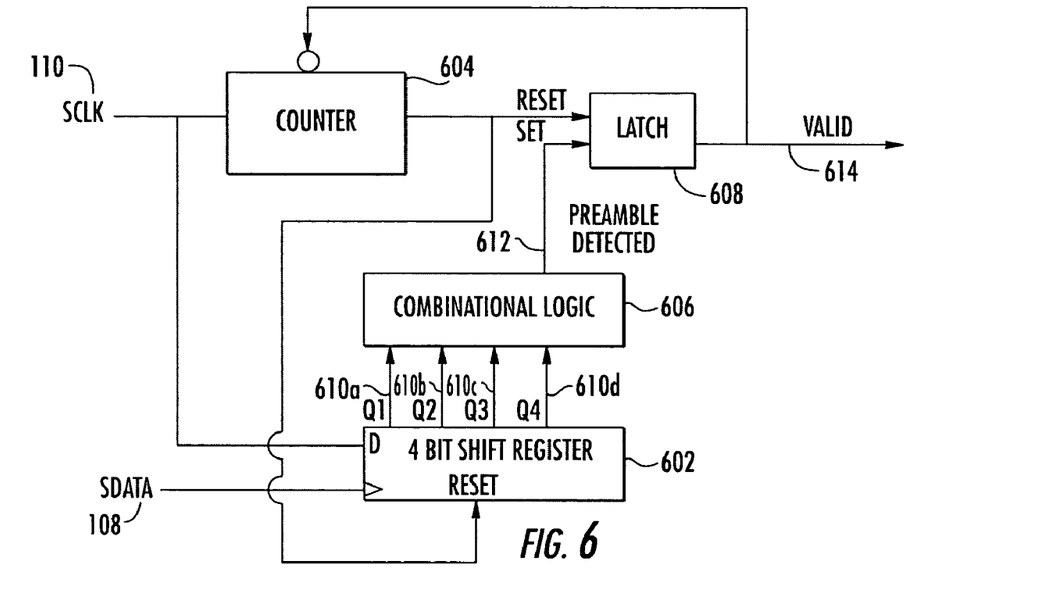
FIG. 6 is a block diagram of the circuitry for detecting a preamble of the two-wire interface.

In response to the preamble detection pulse 308 at time $t_3$, a valid signal line 312 will go high. The valid signal on the valid signal line 312 is generated from the preamble detection circuit as illustrated in FIG. 6, which will be discussed herein below. The valid signal performs the same function as the SLEN latch enable signal in a standard three-wire interface and enables the slave chip 106 to receive data. The valid signal can be logically combined with an SLEN I/O pad signal. With a suitable pull-up or pull down on the input of the optional SLEN pad, the SLEN pad can be present in a design without influencing the output results. Additionally, the SLEN input can be bonded out and the same design will work with traditional three-wire serial interfaces.

Figure 4:
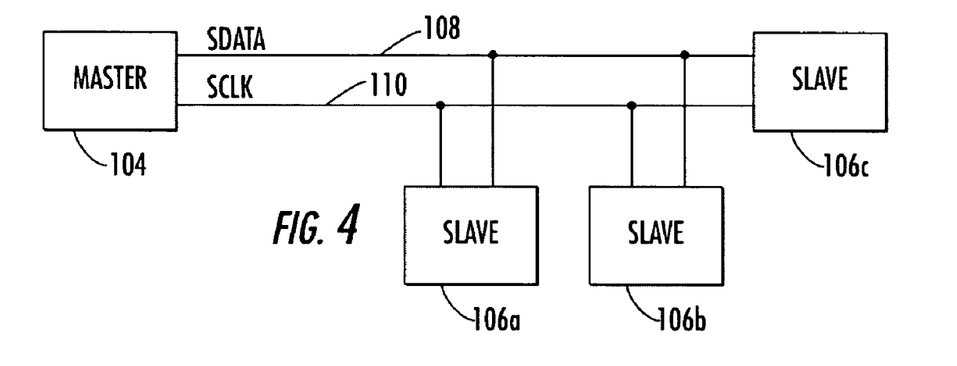
FIG. 4 is a block diagram illustrating a connection using the two-wire interface between a master chip and multiple slave chips.

While the length of the preamble has been described as being three pulses long, additional implementations could use only one or two pulses. By counting and suitably decoding the number of preamble pulses sent by a master chip 104 to several slave chips 106, slave chips may be individually addressed as illustrated in FIG. 4. For example, a single master chip 104 would be able to address three separate slave chips 106*a*, 106*b*, and 106*c* utilizing the two-wire interface preamble described above. In this case, the pulses transmitted on the SDATA line 108 could be counted by each of the slave devices 106 when the SCLK line 110 is held static. If a single pulse was detected, this could be associated with data to be transmitted to slave chip 106*a*. When two pulses were detected on SDATA line 108, this could be associated with data being directed to slave chip 106*b*, and when three pulses were detected on SDATA line 108, this could be associated with data directed to slave chip 106*c*. The number of pulses associated with a particular slave chip 106 may of course be altered as appropriate to any design considerations. Thus, individual slave chips 106 may be addressed by associating a particular number of pulses within the preamble on the SDATA line while the SCLK line 110 is being held constant with a particular slave chip 106.

Figure 5:
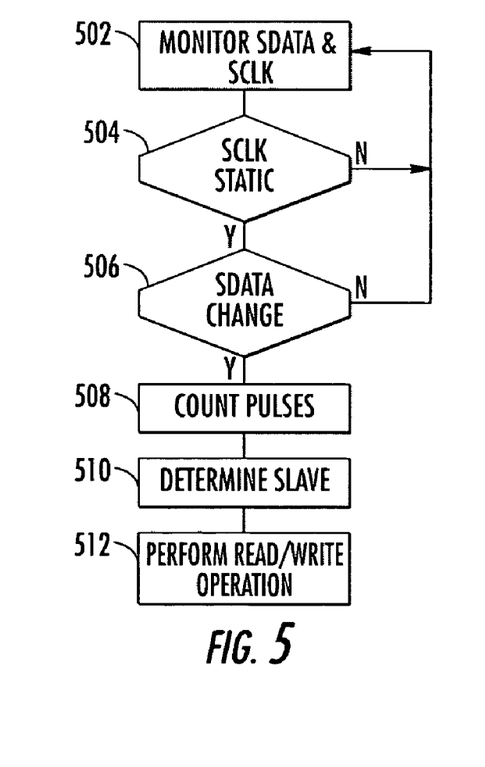
FIG. 5 is a flow diagram illustrating the operation of the two-wire interface according to the present disclosure.

Referring now to FIG. 5, there is illustrated a flow diagram describing the operation of the protocol associated with the preamble of FIG. 3. Initially, the slave device 106 will monitor at step 502 both the SDATA and SCLK lines for the conditions indicating transmission of the preamble 204. Inquiry step 504 detects when the SCLK line 110 remains static for multiple clock pulses. If this is detected, inquiry step 506 determines whether the SDATA line 108 is changing at the time the SCLK line 110 is static. If so, the number of pulses on the SDATA line 108 are counted at step 508. If multiple slaves are connected to the SDATA line 108 and SCLK line 110, a determination is made from the number of pulses as to the particular slave chip 106 being addressed. In a case where a single slave chip 106 is connected to the SDATA line 108 and SCLK line 110, step 510 would not be necessary. At step 512, a read/write operation is performed between the master chip 104 and slave chip 106 as appropriate responsive to the detected pulses.

Referring now to FIG. 6, there is illustrated the circuitry for detecting the preamble on the two-wire interface 102. The SDATA signal is input into the clock input of a 4-bit shift register 602. While the present discussion revolves around a 4-bit register 602, the register 602 need only be as long as the minimum number preamble pulses needed to address the slave chip 106. If the slave chip 106 is intended to work with other slave chips on the same serial interface bus it is useful to have the shift register to be longer by one bit than the number of pulses of the slave chip to determine if more preamble pulses have been sent than required, and hence the message can be ignored as it is intended for another slave device component. The SCLK signal is input to a counter 604, and into the D-input of the 4-bit shift register 602. When a preamble is present upon the SCLK line 110, the D-input of the 4-bit shift register 602 will go high. As the SDATA line 108 begins to apply pulses to the clock input of the 4-bit shift register 602, the high D-input of the 4-bit shift register 602 will be sequentially latched across the four outputs 610 of the 4-bit shift register 602. Thus, in response to the high D-input and a first pulse on SDATA line 108, the Q1 line 610a will go high. In response to the next clock pulse on the SDATA line, the Q2 line 610b will go high. In response to the third pulse, the Q3 line 610c will go high, and in response to the fourth pulse, the Q4 line 610d will go high. The outputs 610 of the 4-bit shift register 602 are input to combinational logic 606 which detects the number of pulses indicating the presence of a preamble. When combinational logic 606 detects a preamble, the preamble detected line 612 will go high and provide an input to latch 608 indicating detection of the preamble. The latch 608 outputs an indication of the valid preamble detected on line 614 and enables an associated slave chip 106. The output of the latch 608 is also applied back to counter 604. The counter 604 generates a reset signal for resetting the latch 608 when the control word has completed transmission and for resetting the 4-bit shift register 602 after the preamble has been detected and the remainder of the control word associated with the preamble has been transmitted.

Figure 7:
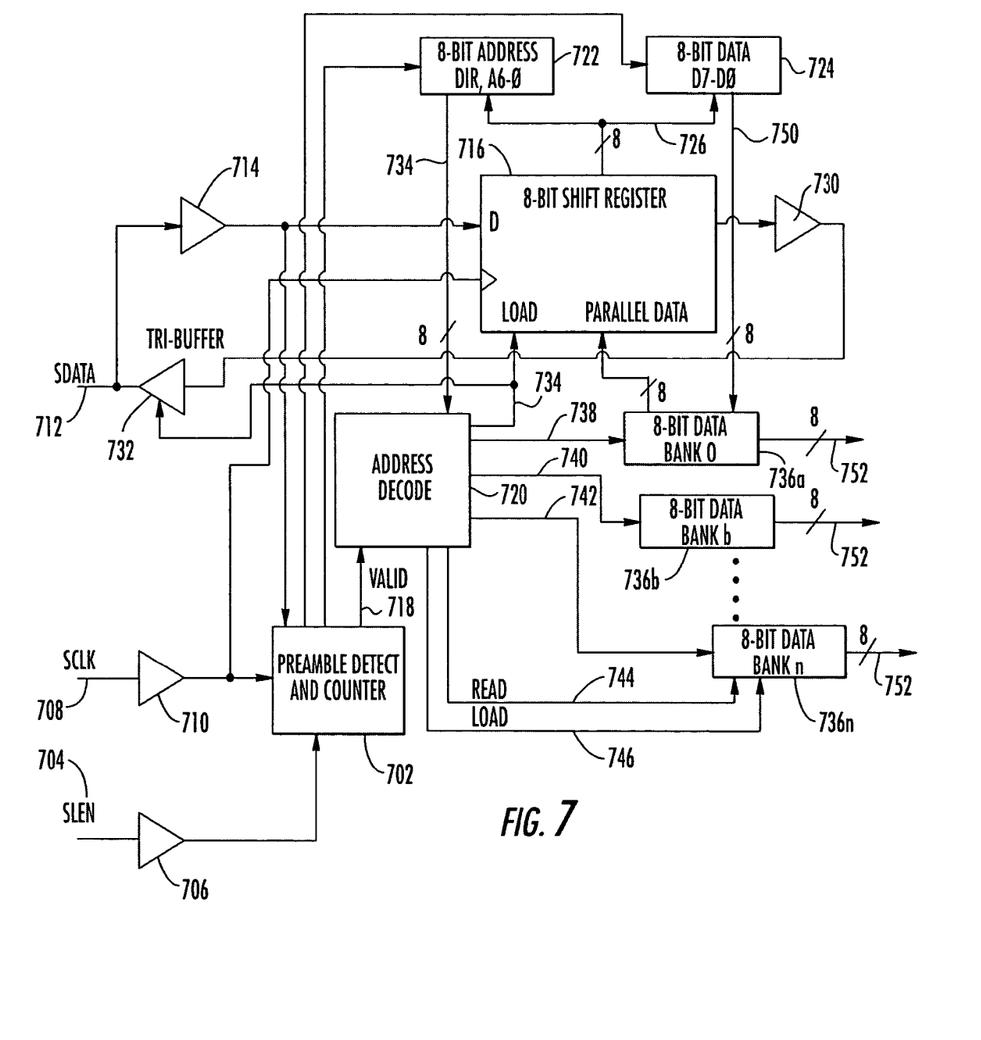
FIG. 7 is a block diagram of a two-wire/three-wire serial control module.

The preamble detection circuitry is implemented in one embodiment within a two-wire/three-wire serial control module as illustrated in FIG. 7. The preamble detect and counter circuitry 702 is interconnected to receive inputs from the SLEN line 704. The SLEN line 704 is connected to the input of an amplifier 706. The output of the amplifier 706 is connected to an input of the preamble detect and counter circuitry 702. SCLK line 708 is connected to the input of amplifier 710. The output of amplifier 710 is connected to another input of the preamble detect and counter circuitry 702. The SDATA line 712 is connected to the input of an amplifier 714. The output of amplifier 714 is connected to a third input of the preamble detect and counter 702 and to the D-input of an 8-bit shift register 716. The preamble detect and counter circuitry 702 provides the valid output line 718 indicating whether a preamble has been detected and to enable address decoder 720. Additionally, the received address and data bits are provided to an 8-bit address register 722 and an 8-bit register 724, respectively.

The 8-bit shift register 716 is interconnected with the 8-bit address register 722 and 8-bit data register 724 via an eight line bus 726. The address bits and data bits are received at the 8-bit shift register 716 via the D-input connected to SDATA line 712. As the bits are sequentially shifted into the 8-bit shift register 716 responsive to the clock signal on SCLK line 708 applied to the clock input of the 8-bit data register, the address bits are shifted into the 8-bit address register via bus 726 and the data bits are shifted into the 8-bit data register 716 via bus 726. The 8-bit shift register 716 also provides an output to the input of amplifier 730. The output of the amplifier 730 is connected to an input of tri-state buffer 732.

The 8-bit address register 722 outputs a received 8-bit address over 8-bit parallel bus 734 to the address decoder 720. The address decoder 720 decodes the provided address and provides outputs to the 8-bit shift register 716 via line 734 (load signal) and to the 8-bit data banks 736a, 736b, 736n via lines 738, 740 and 742, respectively. A load signal is also applied to the 8-bit data bank 736n via line 744. Additionally, a read signal is applied to 8-bit data bank 736 via read line 746. The 8-bit data register 724 outputs the data bits on 8-bit parallel bus 750 to 8-bit data bank 736a. Each of the 8-bit data banks 736 provides an 8-bit parallel bus output 752. The load signal on line 734 applied to the load input of 8-bit shift register 716 is also applied to the enable input of the tri-state buffer 732.

Figure 8:
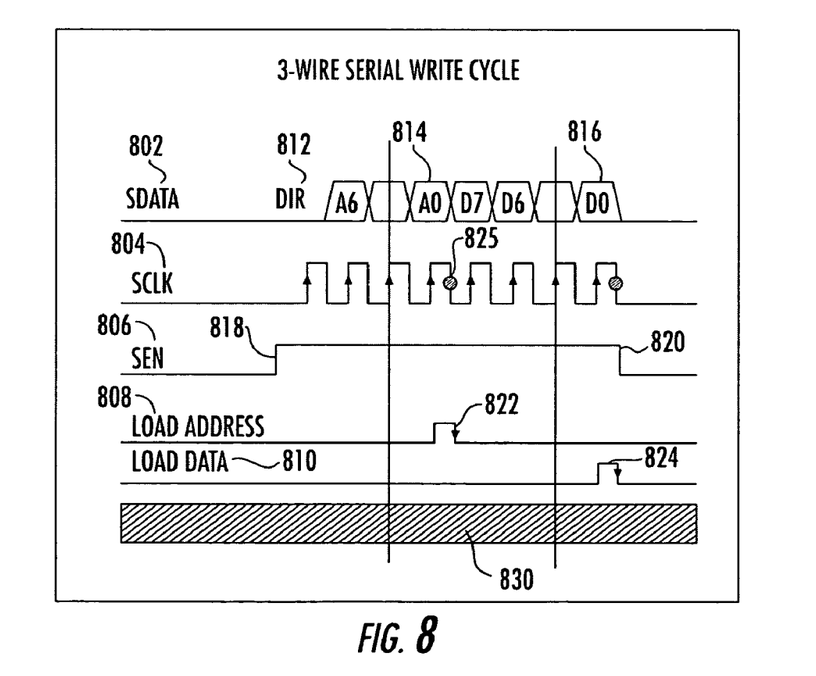
FIG. 8 is a timing diagram illustrating a Write cycle for a three-wire interface.

Referring now to FIG. 8, there is illustrated a timing diagram describing the operation of a three-wire serial Write cycle. The SDATA line 802 transmits a signal including a direction bit 812, seven address bits A6-A0 514, and eight data bits D7-D0 516. While the SDATA line 802 is providing this information, a clock signal is provided on SCLK line 804. A latch enable signal is provided on the SEN line 806 beginning at rising edge 818. The SEN line 506 remains high until all of the address bits and data bits have been transmitted on the SDATA line 502. The load address line 508 generates a load address pulse 822 following the transmission of the A0 bit. Thus, once the entire address has been received from the SDATA line, the load address pulse 822 is generated to indicate that the complete address has been received and may be loaded into the address decoding circuitry. The load address pulse 822 is generated on the falling clock edge 825 following transmission of the A0 bit. Similarly, the load data line 510 generates a load data pulse 824 responsive to transmission of the last data bit D0 on the SDATA line 502. The load data pulse 824 provides an indication that the data within the data register may be loaded into an indicated address location. During the entire three-wire serial Write cycle, the master device controls at 830 the interface between the master chip 104 and slave chip 106.

Figure 9:
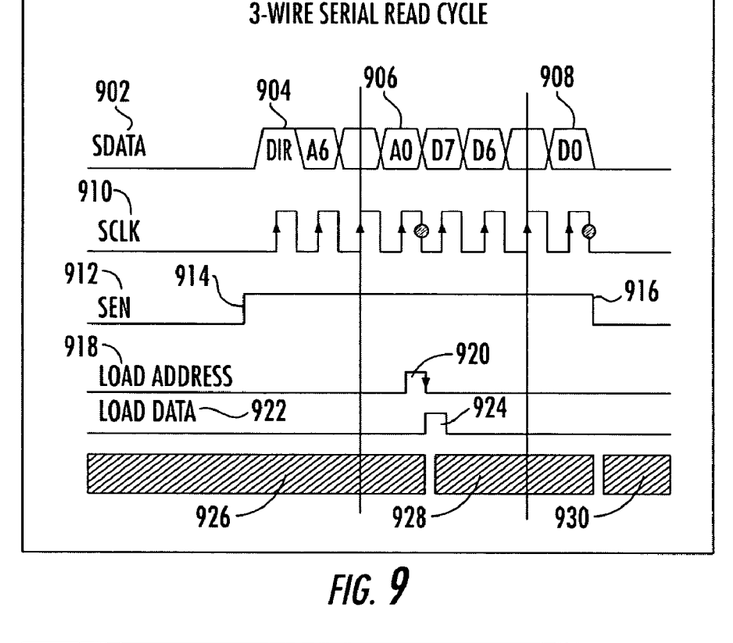
FIG. 9 is a timing diagram illustrating the Read cycle for a three-wire interface.

Referring now to FIG. 9, there is illustrated a three-wire serial Read cycle. The data to be read is transmitted on the SDATA line 902 and includes the direction bit 904, the address bits 906, consisting of bits A6-A0, and the data bits 908, consisting of bits D7-D0. A clock signal is provided on SCLK line 910. The latch enable signal on line SEN 912 enables transmission of the address bits and data bits once the latch enable signal goes high at rising edge 914. The latch enable signal on line SEN 912 remains high until the latch is disabled and the signal goes low on falling edge 914. The load address line 918 generates a load address pulse 920 responsive to receipt of the final address bit A0 on the SDATA line 902. The load address pulse 920 causes the address bits within the 8-bit shift register to be loaded into the decoding circuitry such that the address data may be determined. The load data line 922 provides a load data pulse 924 immediately following the load address pulse 920 on the load address line to enable the master chip 104 to begin reading data bits from the slave chip 106. The master chip 104 drives at 926 the three-wire interface until generation of the load data pulse 924, at which point the slave chip 106 drives at 928 the interface until the latch enable signal goes low at 916, at which point the master chip will retain control of the interface at 930.

Figure 10:
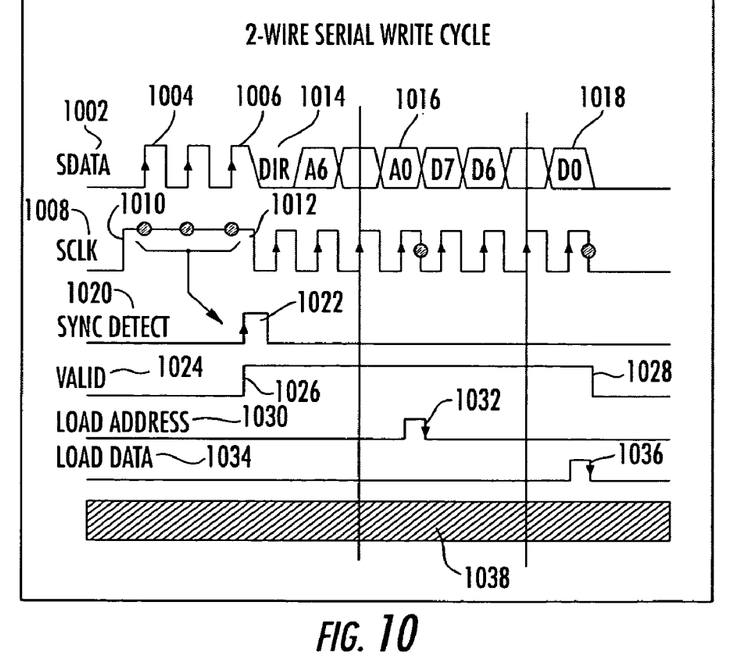
FIG. 10 is a timing diagram illustrating a Write cycle for a two-wire interface.

Referring now to FIG. 10, there is illustrated a timing diagram for a two-wire serial Write cycle according to the present disclosure. The pulses identifying the preamble are provided on the SDATA line 1002 beginning with pulse 1004 and ending with pulse 1006. During the transmission of pulses 1004 through 1006 on the SDATA line 1002, the signal on the SCLK line 1008 is held high beginning at rising edge 1010 until falling edge 1012. After falling edge 1012, the clock signal is again applied to the SCLK line 1008. After transmission of the last preamble pulse 1006, the SDATA line 1002 returns to transmitting the address bits and data bits for the Write cycle. The transmitted data includes a direction bit 1014, the address bits 1016, consisting of bits A6-A0, and the data bits 1018, consisting of bits D7-D0. The sync detect line 1020 provides a preamble detection pulse 1022 to indicate the presence of the preamble condition on the SDATA line 702 and SCLK line 708. Responsive to the preamble detection pulse 722, the signal on the valid line 724 goes high at rising edge 1026 and remains high until transmission of the last data bit D0 on the SDATA line 720 at edge 728. The load address line 730 receives a load address pulse 732 responsive to receipt of the last address bit A0. This enables the address data to be downloaded to a decoder. The load data line 1034 generates a load data pulse 1036 responsive to receipt of the last data bit D0. Responsive to the load data pulse 1036, data is loaded to the proper location from the data registers. The master chip 104 drives at 1038 the two-wire interface throughout the serial Write cycle.

Figure 11:
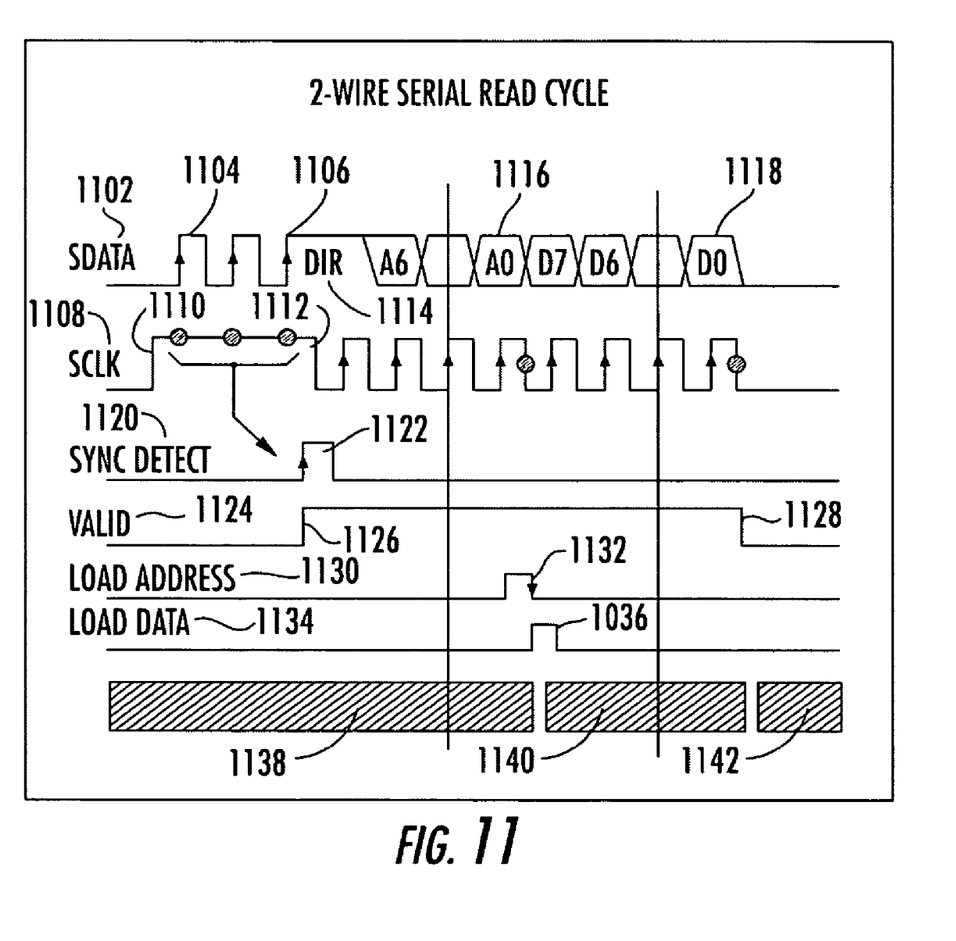
FIG. 11 is a timing diagram illustrating a Read cycle for a two-wire interface.

Referring now to FIG. 11, there is illustrated a timing diagram of a two-wire serial Read cycle according to the present disclosure. A preamble indication is provided on the SDATA line 1102 by generating a series of pulses beginning with pulse 1104 and ending with pulse 1106. While the pulses 1104-1106 are being transmitted on the SDATA line 1102, the signal on the SCLK line 1108 is held high beginning at rising edge 1110 until falling edge 812. After the preamble indication is detected on the SDATA line 1102 and SCLK line 1108, the SDATA line 1102 continues transmitting the remainder of the data including the direction bit 1114, the address bits 1116, consisting of bits A6-A0, and the data bits 818, consisting of data bits D7-D0. The signal on SCLK line 1108 provides a clock signal after the preamble, starting at falling edge 1112. The sync detect line 1120 provides a preamble detected pulse 1122 indicating the detection of a preamble. Responsive to the preamble detection pulse 1122, the signal on the valid line 1124 goes high at rising edge 1126 and remains high until all of the data bits 1118 are transmitted on the SDATA line 1108. The load address line 1130 generates a load address pulse 1132 after the last address bit A0 has been transmitted on the SDATA line 1108. The load address pulse 1132 enables the address bits within an address register to be downloaded into a decoder. The load data line 1134 provides a load data pulse 1136 immediately following the load address pulse 1132. The load data pulse 1136 enables the loading of data to be read from the slave chip 106 to the master chip 104. The master chip 104 drives at 1138 the interface until the load address pulse 1132. After the load address pulse 1132, the slave device drives at 1140 the serial data interface until the last data bit D0 has been read into the master chip 104. After this, the master device again controls the serial data interface beginning at 1142.

Figure 12:
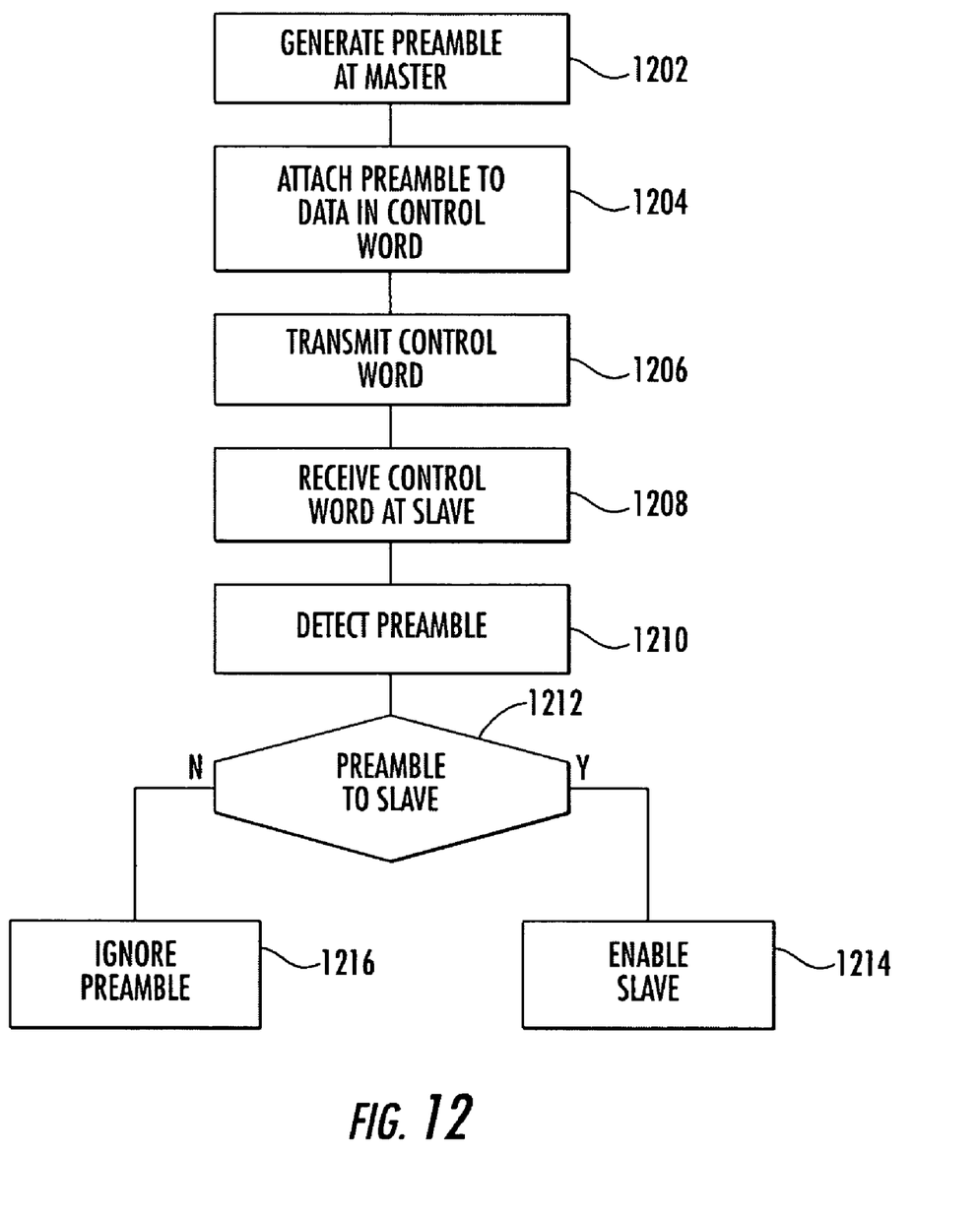
FIG. 12 is a flow diagram illustrating a communication between a master device and a slave device of a Read/Write operation.

FIG. 12 is a flow diagram illustrating a communication of a control word between a master device and a slave device using the two-wire communications serial protocol of the present disclosure. A preamble is generated at step 1202 by the master. The master attaches the preamble to a control word at step 1204. The control word is transmitted at step 1206 over the two-wire interface interconnecting the master and any slave/slaves. The preamble is attached to the control word by controlling the SDATA line and SCLK lines in accordance with the protocol described herein above.

After the control word has been transmitted onto the two-wire interface, the control word is received at one or more slaves at step 1208. Upon receipt of the control word at a slave, the slave will detect, at step 1210, the preamble included within the control word. This provides an indication to the slave that associated data for a Read/Write operation will be forthcoming. The slave determines at inquiry step 1212 whether the received preamble has been directed to the receiving slave device. In the case of a single master connected to a single slave by a two-wire interface, this step would be unnecessary. However, in a situation where multiple slaves are attached to a two-wire interface, the number of pulses in the preamble are counted to determine the addressed slave as described herein above. If inquiry step 1212 determines that the preamble of the control word is directed to the receiving slave, the slave is enabled, at step 1214, to perform the Read/Write operation indicated in the control word. If inquiry step 1212 determines that the received preamble is not directed to the receiving slave device, the preamble is ignored at step 1216 and no action is taken.

The above-described two-wire serial interface differs from standard two-wire interfaces such as SMBUS and I2C in a number of ways. The proposed two-wire interface is relatively simple and hence more efficient to implement than these protocols. Additionally, a single design can be used to communicate with a standard three-wire interface or the described two-wire interface. Finally, a minimal amount of logic is required to be active to listen to the serial bus to determine if the preamble message from the master is intended for a listening slave device. This enables the described two-wire serial interface to provide a number of advantages. A single logic and input/output design may be used to communicate with a standard three-wire interface or with the described two-wire interface. Thus, a single integrated circuit design may interface with both standard three-wire interfaces and the proposed two-wire interface in a lower cost reduced pin count package. The additional overhead for implementing the short preamble signal on the master chip is minimal. Additionally, multiple slave devices may be attached to the same two-wire serial interface bus and address via the multi-pulse addressing scheme described herein above.

Although the preferred embodiment has been described in detail, it should be understood that various changes, substitutions and alterations can be made therein without departing from the spirit and scope of the invention as defined by the appended claims.

What is claimed is:

1. A method for transmitting data over a two wire serial interface, comprising the steps of:
    generating a preamble at a master device over a data line and a clock line of the two wire serial interface, the step of generating the preamble further comprising the steps of:
        transmitting a clock signal on the data line of the two wire serial interface, to a slave device;
        transmitting a data signal at a logical level on the clock line of the two wire serial interface to the slave device;
        maintaining the data signal at the logical level for a first number of pulses of the clock signal on the data line;
    transmitting a data block consisting of address bits via the data signal and data bits on the data line of the two wire serial interface after generation of the preamble; and switching the clock signal from the data line to the clock line to transmit the clock signal on the clock line of the two wire serial interface after the generation of the preamble to the slave device.

2. The method of claim 1, wherein the first number of pulses of the preamble are uniquely associated only with the slave device of a plurality of slave devices.

3. The method of claim 1, wherein the data wire and the clock wire of the two wire interface are also part of a three wire interface.

4. A method for receiving data over a two wire serial interface between a master device and a slave device, comprising the steps of:
  receiving a control word including a preamble and a data block at the slave device;
  detecting the preamble at the slave device over a data line and a clock line of the two wire serial interface, the step of detecting further comprising the steps of:
    detecting a data signal at a logical level on the clock line of the two wire serial interface;
    detecting a clock signal on the data line of the two wire serial interface for a predetermined number of clock pulses associated with the slave device while the data signal remains at the logical level on the clock line; and
  receiving a data block consisting of address bits and data via the data signal after detecting the preamble on the two wire serial interface; and
  receiving the clock signal which has been switched to the clock line of the two wire serial interface after detecting the preamble.

5. The method of claim 4 further including the step of:
  determining a number of pulses on the data line;
  determining when the number of pulses corresponds to the predetermined number of pulses associated with the second device.

6. The method of claim 4, wherein the step of enabling further includes the steps of:
  providing an indication of detection of the clock signal for the predetermined number of pulses; and
  enabling the second device to respond to the control word responsive to the indication of detection.

7. The method of claim 4, further comprising the step of performing a Read operation between the first device and the second device.

8. The method of claim 4, further comprising the step of performing a Write operation between the first device and the second device.

9. The method of claim 4, further including the step of applying at least one of a pull-up or pull-down to a SLEN input of the second device.

10. A method for communicating data over a two wire serial interface between a master device and at least one slave device, comprising the steps of:
  generating a preamble at the master device over a data line and a clock line of the two wire serial interface, the step of generating further comprising the steps of:
    transmitting a clock signal on the data line of the two wire serial interface to a slave device;
    transmitting a data signal at a first logical level on the clock line of the two wire serial interface to the slave device;
    maintaining the data signal on the clock line at the first logical level for a first number of pulses of the clock signal on the data line;
    transmitting a data block consisting of address bits and data bits via the data signal on the data line of the two wire serial interface after the preamble;
  switching the clock signal from the data line to the clock line of the two wire serial interface after the generation of the preamble;
  receiving the preamble at the slave device;
  detecting the preamble at the at least one slave device over the data line and the clock line of the two wire serial interface, the step of detecting further comprising the steps of:
    detecting the data signal at the first logical level on the clock line of the two wire serial interface; and
    detecting the clock signal on the data line of the two wire serial interface for a predetermined number of pulses associated with the slave device while the data signal remains at the first logical level on the clock line;
  receiving the data block consisting of address bits and data via the data signal on the data line of the two-wire serial interface after detecting the preamble; and
  receiving the clock signal on the second line of the two wire serial interface after detecting the preamble.

11. The method of claim 10, wherein the first number of pulses of the preamble are uniquely associated only with the slave device of a plurality of slave devices.

12. The method of claim 10, wherein the data wire and the clock wire of the two wire interface are also part of a three wire interface.

13. The method of claim 10 further including the step of:
  determining a number of pulses on the data line;
  determining when the number of pulses corresponds to the predetermined number of pulses associated with the at least one slave device.

14. The method of claim 10, wherein the step of detecting the preamble further includes the steps of:
  providing an indication of detection of the clock signal for the predetermined number of pulses; and
  enabling the at least one slave device to respond to the detection of the preamble responsive to the indication of detection.

15. The method of claim 10, further comprising the step of performing a Read operation between the master device and the at least one slave device.

16. The method of claim 10, further comprising the step of performing a Write operation between the master device and the at least one slave device.

17. The method of claim 10, further including the step of applying at least one of a pull-up or pull-down to a SLEN input of the at least one slave device.

18. A method for communicating data over a serial interface between a master device and at least one slave device, comprising the steps of:
  generating a preamble at the master device over a serial data line and a serial clock line of the two wire serial interface, the step of generating further comprising the steps of:
    transmitting a clock signal on the serial data line of the two wire serial interface, to a slave device;
    transmitting a data signal at a first logical level on the serial clock line to the slave device;
    maintaining the data signal at the first logical level for a first number of pulses of the clock signal;

receiving the preamble at the slave device;
detecting the preamble at the slave device over the serial data line and the serial clock line, the step of detecting further comprising the steps of:
  detecting the data signal at the first logical level on the serial clock line of the two wire serial interface;
  detecting the clock signal on the serial data line of the two wire serial interface for a predetermined number of pulses associated with the second device while the data signal remains at the first logical level on the serial clock line;
  receiving on the serial data line a data block consisting of address bits and data via the data signal after detecting the preamble; and
  receiving the clock signal which has been switched to the serial clock line of the two wire serial interface after detecting the preamble.

19. The method of claim 18, further including the step of applying at least one of a pull-up or pull-down to a SLEN input of the at least one slave device.

* * * * *